Figure 1:
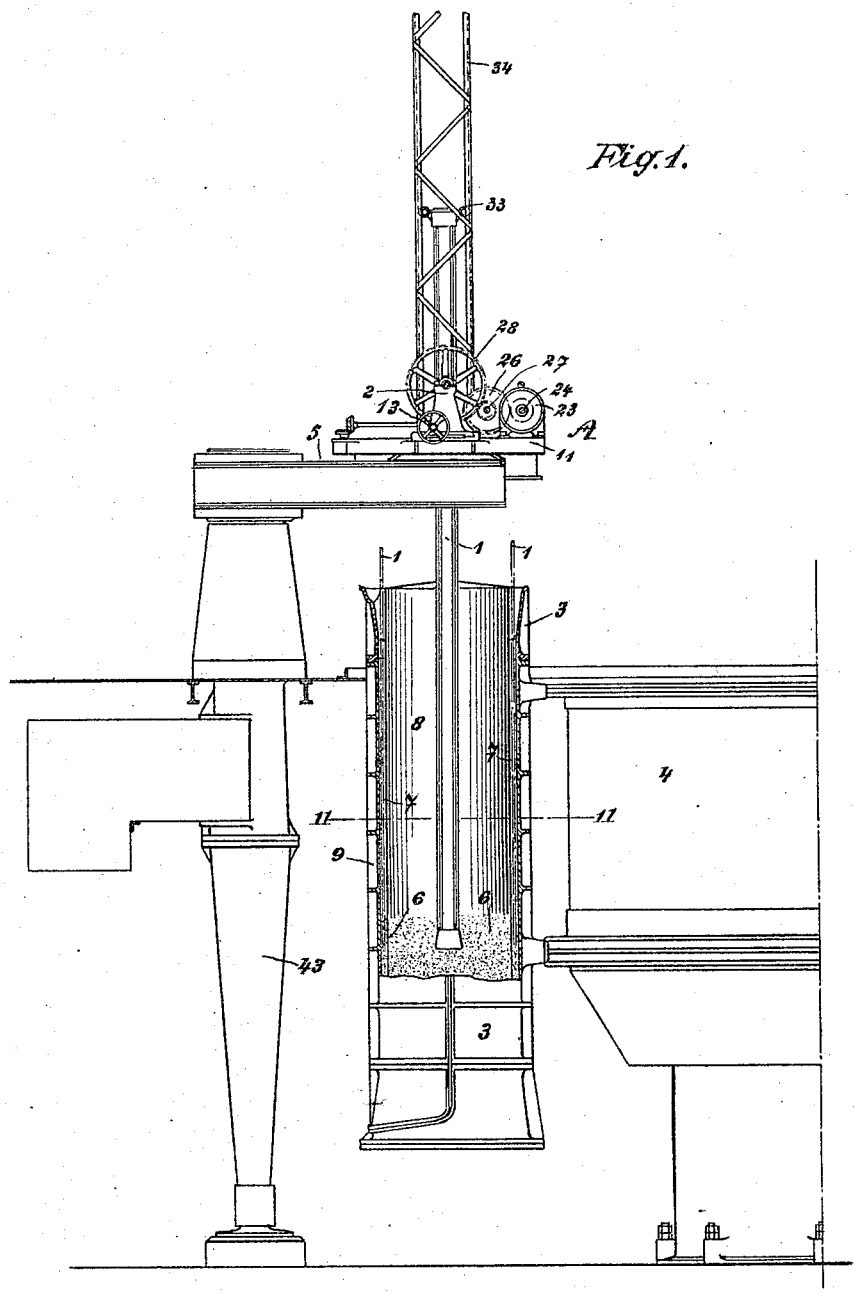

R. ARDELT.
PIPE MOLDING MACHINE.
APPLICATION FILED APR. 8, 1913.

1,183,713.

Patented May 16, 1916.
4 SHEETS—SHEET 1.

R. ARDELT.
PIPE MOLDING MACHINE.
APPLICATION FILED APR. 8, 1913.
1,183,713.
Patented May 16, 1916.
4 SHEETS—SHEET 2.
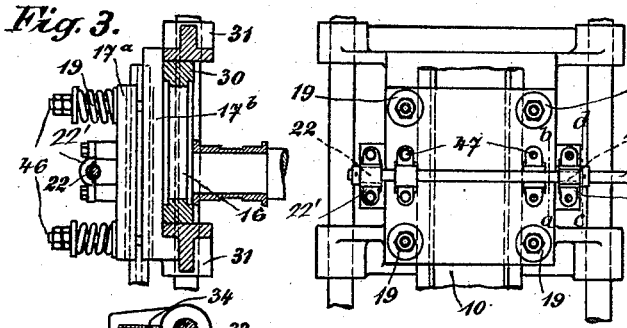
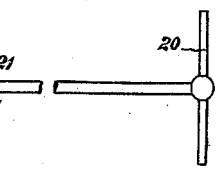
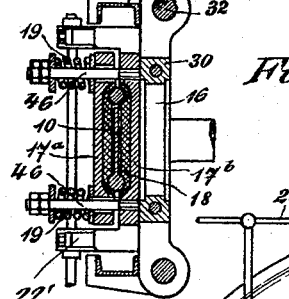
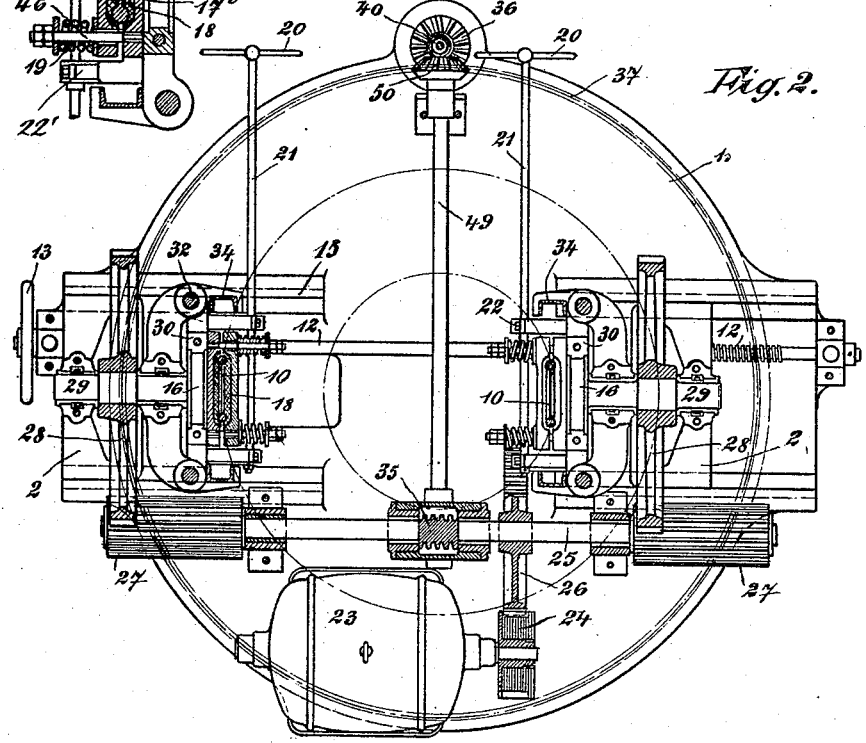

R. ARDELT.
PIPE MOLDING MACHINE.
APPLICATION FILED APR. 8, 1913.

1,183,713.

Patented May 16, 1916.
4 SHEETS—SHEET 3.

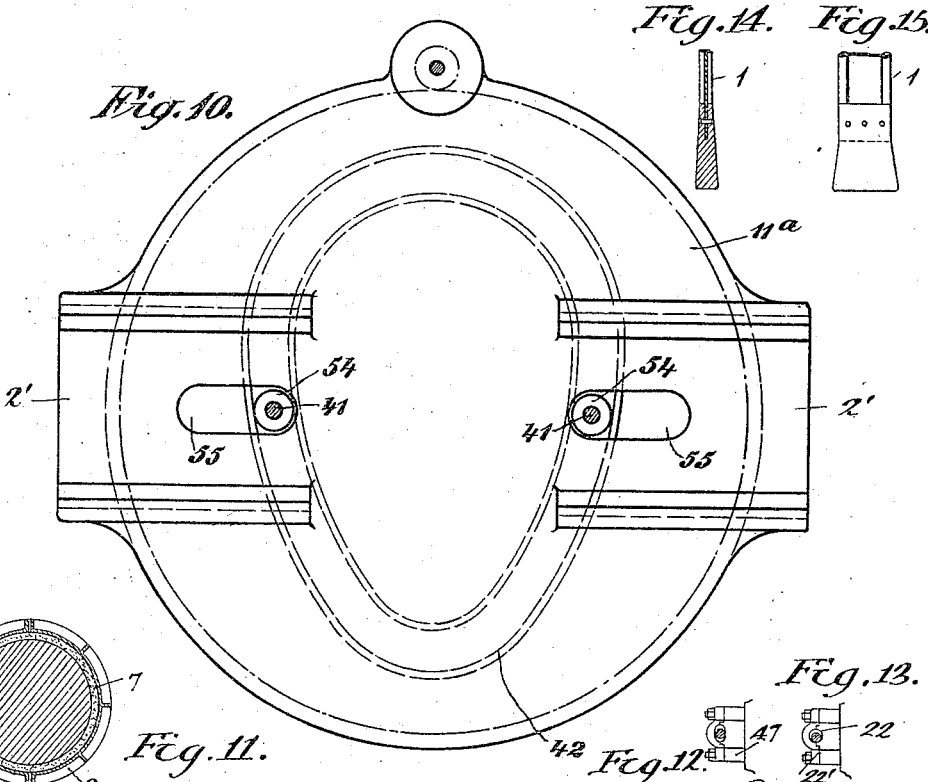

UNITED STATES PATENT OFFICE.

ROBERT ARDELT, OF EBERSWALDE, NEAR BERLIN, GERMANY.

PIPE-MOLDING MACHINE.

1,183,713.  Specification of Letters Patent.  Patented May 16, 1916.

Application filed April 8, 1913. Serial No. 759,720.

*To all whom it may concern:*

Be it known that I, ROBERT ARDELT, a subject of the German Emperor, and resident of Eberswalde, near Berlin, Germany, have invented a certain new and useful Improvement in Pipe-Molding Machines, of which the following is a specification.

Stamping machines for forming pipe molds at present in use are arranged for the speedy production of a large number of pipe molds of equal diameter. There is however a greater demand for the speedy production in one machine of a large number of pipe molds of different diameters, since only a few pipe foundries are arranged for the production of pipes on such a large scale, that it would be profitable to provide a machine for each form of pipe. The difficulty has been to arrange a machine in such manner, that it can be used first for stamping pipe molds of small diameter and then for stamping pipe molds of large diameter or vice versa.

The present invention relates to a machine which can be quickly and simply converted when pipes of different width are to be produced. This is effected by the improved arrangement and improved form of the clutch casings carrying the rammers. While in the usual molding machines the clutch casings are secured firmly to the rotating disk or other suitable part of the machine, the clutch casings arranged in accordance with the present invention are separate from one another and are relatively adjustable to vary their distance apart, for example by being moved together with nuts relatively to one another on left and right hand threads of a common threaded spindle. The clutch casings are also formed in such manner, that after passage of the rammers therethrough, and after movement of the rammers into the highest position they can easily be opened to permit the rammers to drop. To stamp pipe molds with very thin walls with such a molding machine and thus save sand and work, the rammer is made of double T-shape section and is not of substantially rectangular form as hitherto usual. This section gives greater strength to the rammers, a result which, apart from the considerable reduction in weight, is of great importance in view of the relatively great length of the rammers and in view of the bending strain produced by the continuous rotation of the machine.

Figure 6:
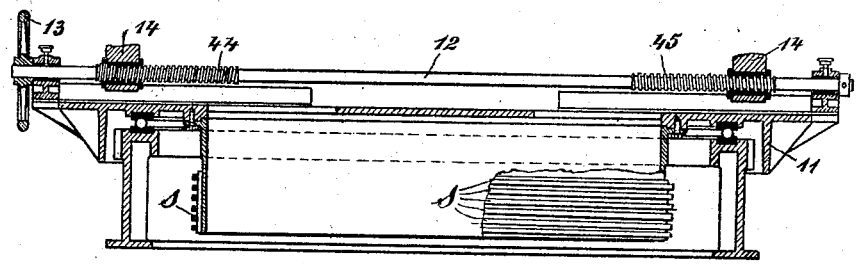
Figure 7:
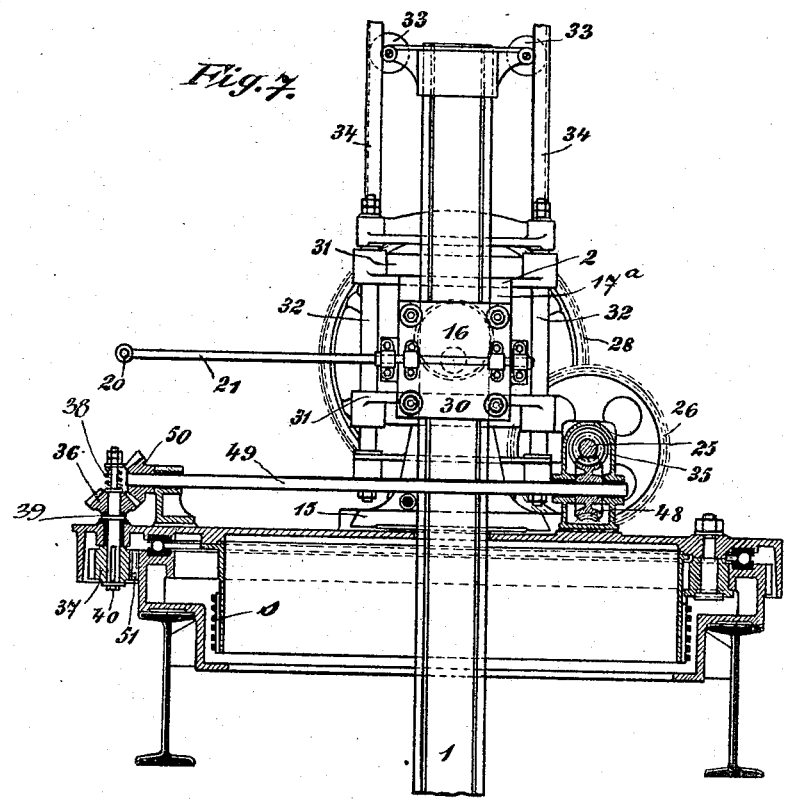

One embodiment of the improved molding machine is illustrated in the accompanying drawings in which:

Figure 1 shows the machine in conjunction with a pipe molding box carried by a rotating support. Fig. 2 is a plan view, partly in section, of the actuating mechanism of the ram rods or rammers. Figs. 3, 4 and 5 show the clutch casing in side view, in cross section and in elevation respectively. Fig. 6 is a longitudinal section through the rotating disk with the arrangement for adjusting the carriages supporting the clutch casings. Fig. 7 is a section corresponding to Fig. 6 showing also the actuating mechanism for the rotating disk. Figs. 8 and 9 show a modified form of rammer, a ring rammer, in side view and horizontal section respectively. Fig. 10 shows a modified form of the rotating disk of the molding machine, intended for use in stamping pipe molds of oval cross section. Fig. 11 is a section on line 11—11 of Fig. 1. Fig. 12 is a section on line $a$—$b$ of Fig. 5. Fig. 13 is a section on line $c$—$d$ of Fig. 5. Fig. 14 is an end view partly in section of one of the rammers. Fig. 15 is a side view of the same.

The actuating mechanism A (Fig. 1) of the ram rods or rammers 1 in the embodiment illustrated is arranged on a jib 5 pivoted about a standard 43. The pipe molding box 3 which is carried by a rotatable support 4 is brought in known manner into position beneath the rammers 1. If however the pipe molding boxes are fixed the actuating mechanism A of the molding machine is brought over the box 3 *i. e.* it is moved for example on a movable support from one molding box to another. The rammers 1 have, as shown particularly in Figs. 2 and 4, a substantially double-T cross section 10, and have a narrow web and comparatively large flanges. The rammers are carried in known manner by clutch casings, which in the present invention are fixed somewhat after the manner of lathe saddles on the rotating disk 11 containing the actuating mechanism A of the rammers. The carriages 2 carrying the clutch casings, can be adjusted relatively to one another by means of a spindle 12 (Fig. 6) provided with left and right hand threads 44, 45 and by means of a hand wheel 13 and the nuts 14, and slide in dovetailed guides 15. In the position shown in Fig. 2 the right hand carriage 2 is in its innermost position and the left hand carriage 2 in its outermost position. In actual practice the carriages are adjusted in such manner, that the rammers carried thereon are located at equal distances from the center.

The carriages 2 carry the rammers which are guided by rollers 33 in the U-shaped rails 34 of the frame, through the intermediary of clutch members 17$^a$ and 17$^b$, which are fitted with shoes 18 of vulcan fiber in order to increase the friction on the rammers. The clutch members are pressed together by springs 19 on bolts 46. The bolts are arranged in the clutch member 17$^b$ which is rigidly connected with the two cross beams 31. The beams 31 slide up and down on the guides 32 secured to the carriages 2. The loose clutch member 17$^a$ carries in bearings 47 a shaft 21 provided with a handle 20 and cams 22 (Figs. 2 to 5). The raising and lowering of the clutch casings is effected by an eccentric disk 16 (Figs. 3 and 7). The eccentric disk is carried in a bearing 30 which is guided in a straight line by the cross beams 31. These cross beams slide up and down on the guide rods 32. The rotation of the eccentric disk 16 of each carriage 2 is effected by a shaft 29 (Fig. 2). On the shaft is arranged a pinion 28 which meshes with a pinion 27 secured to the countershaft 25. The pinions 27 are of such length that they mesh always with the pinions 28 in any position of the carriage 2 to position the rammers according to the internal width of the pipe mold to be produced. The pinion 26 mounted on the countershaft 25 is driven by the pinion 24 of the motor 23 to which the current is supplied by slip rings $s$ (see Figs. 6 and 7). While the vertical movement of the rammers is effected by the eccentric disks 16, rotation during stamping is effected by the rotation of disk 11. For this purpose the rotating disk 11 carrying the actuating mechanism A is also actuated by the motor 23. On the countershaft 25 is arranged a worm 35, which engages a worm wheel 48 arranged on the forward end of a shaft 49. On the other end of this shaft is secured a bevel wheel 50, which meshes with a bevel wheel 36. On the shaft of this bevel wheel is mounted a gear wheel 37 which engages the teeth 51 of the rotating disk 11. In order that the teeth will not become broken, if the resistance in rotating the molding box becomes too great, the bevel wheel 36 is clamped on the shaft 40 instead of being keyed thereon, so that it can slide if necessary. When the rammers have made the sand 6 at the bottom sufficiently compact to form the pipe mold, the friction of the clutch members produced by the springs 19 is overcome and the rammers slide through the clutch members to an extent which corresponds to the depth of sand compressed after each stroke. When the mold is completely stamped and the rammers have reached their uppermost position then the machine is brought over the next molding box or alternatively, the next molding box is brought under the machine. Then the rammers must be lowered again into the annular space between the walls of the molding box and the pattern 8 (Fig. 11). This is effected by rotating the shaft 21 mounted in the bearings 47 (Figs. 12 and 13) whereby the clutch member 17$^a$ is separated from the fixed clutch member 17$^b$ by means of the cam 22 supporting the shaft 21 in the bearings 22', the springs 19 thus being further compressed. By the separation of the two clutch members from one another the friction on the rammers is removed and the latter fall down.

In the annular space 7 between the pattern 8 and the wall 9 of the molding box the rammers 1 meet with a considerable resistance which exerts on them, on account of their great length, a considerable bending strain in the direction of rotation of the machine. For this reason the rammers are formed of a section 10, which combines a great moment of resistance in one direction with a comparatively low total weight of the rammers.

The use for example of double T-shaped section permits of the stamping of pipe molds with comparatively small thickness of walls, since the thin web of the section occupies only a small space between the pattern and the wall of the molding box and the outer surface of the pattern can extend close up to the web.

If just after stamping one form of pipe molds a second form of molds is to be stamped it is only necessary before turning the cam shaft 21, to rotate the spindle 12, which is provided with left and right hand threads, in the corresponding direction by means of the hand wheel 13, so that both carriages 2 approach or recede.

With this apparatus either single rammers 1 may be used, or the improved ring rammer (shown in Figs. 8 and 9) may be used with the rammers. For this purpose the ends of the rammers 1 are connected by any suitable means which anyone skilled in the art may easily employ with the ring 52 which is provided with the usual fingers 53. The diameter of the ring must be chosen to correspond to the diameter of the form of pipe molds to be produced at the time.

As it is possible to use ring rammers of any diameter the sphere of application of the pipe molding machine shown is considerably extended.

The application of this molding machine is not limited to pipe molds of circular section. Pipe molds of oval or other section can easily be produced by supporting the rammers in carriages adjustably arranged on the rotating disk of the machine.

In Fig. 10 is shown the form of rotating disk 11ᵃ employed when the machine is to be used for stamping molds of oval section. In this case a pin 41 with a roller 54 is provided on the carriages 2' instead of the nuts 14. This roller runs in a slot 42 in a fixed part and has the same curvature or form as the mold to be produced. The rotating disk 11ᵃ is provided with slots 55 for the passage of the roller. The two carriages 2' are moved exactly corresponding to the path of the slot 42. In this manner pipe molds or pipes of any section can be stamped by the machine.

Having described my invention what I claim and desire to secure by Letters Patent of the United States is:—

1. In a pipe molding machine the combination with vertically movable rammers, of crank mechanism for operating said rammers, clutch casings adapted to engage said rammers, supports for each of said clutch casings carrying said crank mechanism, a rotating disk carrying said supports, and means for guiding said supports, substantially as described and for the purpose set forth.

2. In a pipe molding machine the combination with vertically movable rammers, of crank mechanism for operating said rammers, clutch casings adapted to engage said rammers, carriages supporting each of said clutch casings carrying said crank mechanism, and nuts for guiding said carriages, a common spindle for said nuts, as and for the purpose set forth.

3. In a pipe molding machine of the kind referred to, the combination with vertically movable rammers, of crank mechanism for operating said rammers, clutch casings adapted to engage said rammers, carriages supporting each of said clutch casings carrying said crank mechanism, nuts for guiding said carriages, pinions mounted on said carriages, a countershaft, and pinions mounted on said countershaft, said pinions last named being adapted to be continuously in engagement with the pinions on said carriages.

4. In a pipe molding machine, the combination with vertically movable rammers, a crank mechanism for operating said rammers, clutch casings adapted to engage said rammers, carriages for supporting each of said clutch casings carrying said crank mechanism, a disk supporting said carriages, said disk being adapted to rotate, means for guiding said supporting carriages and means for varying the position of the rammers and carriages with respect to said disk.

5. A pipe molding machine comprising in combination, vertically movable rammers, a crank mechanism for operating said rammers, clutch casings adapted to engage said rammers, carriages supporting said clutch casings and carrying said crank mechanism, a fixed and a movable member in each of said clutch casings, springs pressing said clutch members together, shafts mounted on said movable clutch member, cams on said shafts, guides secured to said carriages, and cross-beams sliding up and down on said guides, substantially as described and for the purpose set forth.

In testimony whereof I have signed my name to this specification in the presence of two subscribing witnesses.

ROBERT ARDELT.

Witnesses:
 HENRY HASPER,
 WOLDEMAR HAUPT.

Copies of this patent may be obtained for five cents each, by addressing the "Commissioner of Patents, Washington, D. C."